(12) United States Patent
Chen et al.

(10) Patent No.: US 12,097,461 B2
(45) Date of Patent: Sep. 24, 2024

(54) METHOD FOR TREATING ARSENIC-CONTAINING FLUE GAS

(71) Applicants: BGRIMM TECHNOLOGY GROUP, Beijing (CN); Kunming University of Science and Technology, Kunming (CN)

(72) Inventors: Guoqiang Chen, Beijing (CN); Senlin Tian, Yunnan (CN); Ping Ning, Yunnan (CN); Xiaosong Yang, Beijing (CN); Linan Shao, Beijing (CN); Zhilong Zhao, Beijing (CN)

(73) Assignees: BGRIMM TECHNOLOGY GROUP, Beijing (CN); Kunming University of Science and Technology, Kunming (CN)

( * ) Notice: Subject to any disclaimer, the term of this patent is extended or adjusted under 35 U.S.C. 154(b) by 232 days.

(21) Appl. No.: 17/546,786

(22) Filed: Dec. 9, 2021

(65) Prior Publication Data

US 2023/0080405 A1 Mar. 16, 2023

(30) Foreign Application Priority Data

Sep. 13, 2021 (CN) .......................... 202111066475.7

(51) Int. Cl.
*B01D 53/00* (2006.01)
*B01D 5/00* (2006.01)
*B01D 46/02* (2006.01)

(52) U.S. Cl.
CPC ......... *B01D 53/002* (2013.01); *B01D 5/0021* (2013.01); *B01D 5/0072* (2013.01); *B01D 46/02* (2013.01)

(58) Field of Classification Search
CPC .. B01D 53/002; B01D 53/005; B01D 5/0021; B01D 5/0072; B01D 46/02
See application file for complete search history.

(56) References Cited

U.S. PATENT DOCUMENTS

| | | | |
|---|---|---|---|
| 2017/0354900 A1* | 12/2017 | Imazu | .................. B01D 5/0021 |
| 2021/0101099 A1* | 4/2021 | Wang | ....................... B01D 8/00 |
| 2021/0291095 A1* | 9/2021 | Peterson | ................... E03B 3/28 |

FOREIGN PATENT DOCUMENTS

CN 109207743 A * 1/2019

* cited by examiner

*Primary Examiner* — Nelson J Nieves
(74) *Attorney, Agent, or Firm* — Kirk A. Wilson; Joseph T. Guy; Patent Filing Specialist Inc.

(57) ABSTRACT

A method for treating arsenic-containing flue gas is disclosed. In the method, the arsenic-containing flue gas is subjected to a dry pre-dedusting treatment, and the dedusted flue gas is pre-cooled and then introduced into a vortex quenching system. The arsenic-containing flue gas is divided into high-temperature flue gas and low-temperature flue gas through the vortex quenching system. The outlet temperature of the low-temperature flue gas is dropped below the desublimation temperature of gaseous arsenic trioxide. The low-temperature flue gas is subjected to a gas-solid separation to obtain solid arsenic trioxide and treated flue gas.

10 Claims, 3 Drawing Sheets

METHOD FOR TREATING ARSENIC-CONTAINING FLUE GAS

CROSS REFERENCE TO RELATED APPLICATION(S)

This patent application claims the benefit and priority of Chinese Patent Application No. 202111066475.7 filed on Sep. 13, 2021, the disclosure of which is incorporated by reference herein in its entirety as part of the present application.

TECHNICAL FIELD

The present disclosure relates to the technical field of flue gas treatment, and in particular, to a method for treating arsenic-containing flue gas.

BACKGROUND ART

At present, technologies for removing (recovering) arsenic from non-ferrous smelting flue gas are divided into wet method technologies and dry method technologies. In the wet method technologies, diluted acid multi-stage washing and electric demisting purification are generally adopted to meet requirements for subsequent production of acid from flue gas. Gaseous arsenic in the flue gas enters a liquid phase, so as to be removed from the flue gas. Acidic wastewater containing arsenic and heavy metals is generated after the treatment. The acidic wastewater is complex in components, and its treatment is highly difficult and high in cost. In the dry method technologies, the arsenic in the flue gas is converted from a gaseous state into a solid state and is separated by cooling. At present, a conventional flue cooling method is generally used. However, the cooling in the prior art is a slow cooling, and thus the residence time of flue gas temperature within the glassy arsenic forming temperature interval is too long, resulting in that glassy arsenic is easily generated to cause the problems of adhesion and blockage in a flue gas treatment system. If the flue gas is cooled by a quenching method capable of cooling suddenly, such that the flue gas temperature rapidly passes through the glassy arsenic forming temperature interval, which could solve the blockage problem caused by the glassy arsenic.

The existing flue gas quenching method includes two types, i.e. water-cooling quenching and immersion cooling. Due to the limitation of process conditions, the immersion cooling has not been performed on engineering facilities temporarily, which leads to its low universality. The water-cooling quenching is relatively more widely used. At present, an evaporative cooling quenching tower is commonly used. It has a working principle as follows: when flue gas passes through a settling container, a proper amount of water is atomized and sprayed out at the top of the settling container; the water is instantly vaporized in the flue gas, and a large amount of heat is absorbed during vaporization, thereby cooling the flue gas. The amount of water to be vaporized is controlled according to the amount of inlet flue gas, the temperature of the flue gas, and a target temperature of the flue gas. Although the purpose of quench could be effectively achieved by using such quencher, the dew point of the flue gas is reduced and dew is easily formed on an outer wall of equipment or a pipeline due to the fact that a large amount of water vapor enters the flue gas, thereby leading to the corrosion of a dust collection pipeline and the equipment. In addition, The quencher has strict requirements on gas volume, temperature and automatic control device before and after the flue gas system. Once a control system or a spray nozzle fails, and a water amount change and a water spraying state are not ideal, dew and white arsenic slurry easily appear in the quencher, along pipelines, and in the equipment, which makes the whole system paralyze.

CN104451167A discloses a cooling method by using a spray quenching tower, in which arsenic-containing flue gas was subjected to a multi-stage cooling to condense arsenic in flue gas, and then arsenic was recovered by using a bag-type dust collector. In the method, a quench is mainly achieved by spraying cooling water. If water is sprayed in an amount that is not properly controlled, the corrosion or blockage of the system will be easily caused.

CN205576244U discloses that arsenic-containing flue gas is quenched by using ice slurry to remove arsenic. In the technical solution, gaseous arsenic is converted into solid arsenic through an ice slurry spray gun assembly and a quenching tower, and an arsenic recovery system is still needed for recovering arsenic. In the method, a quench is realized by a spray cooling method. A spray medium was the ice slurry, and the problem of poor arsenic removal effect or blockage was also encountered easily when the slurry is sprayed in an amount that is not properly controlled.

CN108187436A discloses a method for removing arsenic by quenching and cooling arsenic-containing flue gas by using a granular medium in a circulating fluidized bed. The cooled flue gas flows out from the top of the fluidized bed, and arsenic is collected at the bottom of the fluidized bed. However, the method mainly depends on the granular medium in the fluidized bed. If the concentration of the smoke and dust contained in inlet gas is not properly controlled, the blockage of the system is easily caused, which reduces the flow velocity of the flue gas, causes a poor cooling effect easily, and negatively affects the removal effect of arsenic by quenching.

SUMMARY

An object of the present disclosure is to provide a method for treating arsenic-containing flue gas. Through the method of the present disclosure, corrosion or blockage of a treatment system could be avoided, and meanwhile, the recovery rate of arsenic in the flue gas could be improved.

To achieve the abovementioned object, the present disclosure provides the following technical solutions:

The present disclosure provides a method for treating arsenic-containing flue gas, including the following steps:
subjecting the arsenic-containing flue gas to a dry pre-dedusting treatment to obtain dedusted flue gas;
pre-cooling the dedusted flue gas and introducing the pre-cooled flue gas into a vortex quenching system to obtain high-temperature flue gas and low-temperature flue gas; and
subjecting the low-temperature flue gas to a gas-solid separation to obtain treated flue gas and arsenic trioxide.

In some embodiments, the dry pre-dedusting treatment is performed in a high temperature-resistant pre-dedusting system.

In some embodiments, pre-cooling the dedusted flue gas includes introducing the dedusted flue gas into a heat energy utilization system and cooling.

In some embodiments, the pre-cooled flue gas has a residence time of 1 to 3 seconds in the vortex quenching system, and the low-temperature flue gas has a temperature of not more than 150° C.

In some embodiments, the vortex quenching system includes a gas inlet pipe 1, a gas inlet spray nozzle 2, a vortex chamber 3, a low-temperature gas outlet 4, a high-temperature gas buffer chamber 5, a gas outlet adjustment valve 6, and a high-temperature gas outlet 7. The gas inlet spray nozzle 2 is arranged at the top of the vortex chamber 3. The gas inlet pipe 1 is connected to the gas inlet spray nozzle 2. The low-temperature gas outlet 4 is arranged on one side of the vortex chamber 3. The high-temperature gas buffer chamber 5 is arranged on the other side of the vortex chamber 3. The high-temperature gas outlet 7 is arranged at one end, far away from the vortex chamber 3, of the high-temperature gas buffer chamber 5. The high-temperature gas outlet 7 is provided with the gas outlet adjustment valve 6.

In some embodiments, the gas inlet spray nozzle 2 is arranged in the tangential direction of the vortex chamber 3, and the gas inlet direction is tangent to the vortex chamber 3.

In some embodiments, the relationship between the length L of the high-temperature gas buffer chamber 5 and the diameter H of the vortex chamber 3 is represented by L/H=20-40.

In some embodiments, the high-temperature flue gas is recycled to the heat energy utilization system.

In some embodiments, the gas-solid separation is performed in a bag-type dust collector.

In some embodiments, the treated flue gas has an arsenic element content of 0.15 to 0.35 mg/m$^3$, and a dust content of 16 to 20 mg/m$^3$.

The present disclosure provides a method for treating arsenic-containing flue gas. In the present disclosure, the arsenic-containing flue gas is subjected to a dry pre-dedusting treatment, and dedusted flue gas is pre-cooled and then introduced into a vortex quenching system. The arsenic-containing flue gas is divided into high-temperature flue gas and low-temperature flue gas in the vortex quenching system. The outlet temperature of the low-temperature flue gas is dropped below the desublimation temperature of gaseous arsenic trioxide, and the low-temperature flue gas is subjected to a gas-solid separation to obtain solid arsenic trioxide and treated flue gas. By a vortex quenching, the method of the present disclosure makes it possible to greatly reduce the flue gas temperature and improve the efficiency of sudden drop of flue gas temperature and the stability of accurate control of flue gas cooling temperature. By controlling a vortex cooling temperature, the flue gas temperature could avoid a glassy arsenic forming temperature interval of 170° C. to 245° C., so as to avoid the formation of glassy arsenic in the flue gas and improve the recovery rate of the arsenic in the flue gas. The method of the present disclosure is simple, convenient to operate, strong in gas fluctuation impact resistance, safe and reliable in operation, and easy to maintain.

Compared with the conventional method for removing arsenic by quenching, the present disclosure has important advantages and differences in that complex heating or cooling equipment is not needed to realize rapid temperature rise and drop of gas and simplify the equipment and process, and that arsenic could be effectively separated from the flue gas after cooling, and that the heated flue gas could be recycled to the system to recover heat energy, thereby achieving a good energy-saving effect.

BRIEF DESCRIPTION OF THE DRAWINGS

In FIGS. 1 and 2, 1 represents a gas inlet pipe, 2 represents a gas inlet spray nozzle, 3 represents a vortex chamber, 4 represents a low-temperature gas outlet, 5 represents a high-temperature gas buffer chamber, 6 represents a gas outlet adjustment valve, and 7 represents a high-temperature gas outlet.

DETAILED DESCRIPTION OF THE EMBODIMENTS

Figure 1:
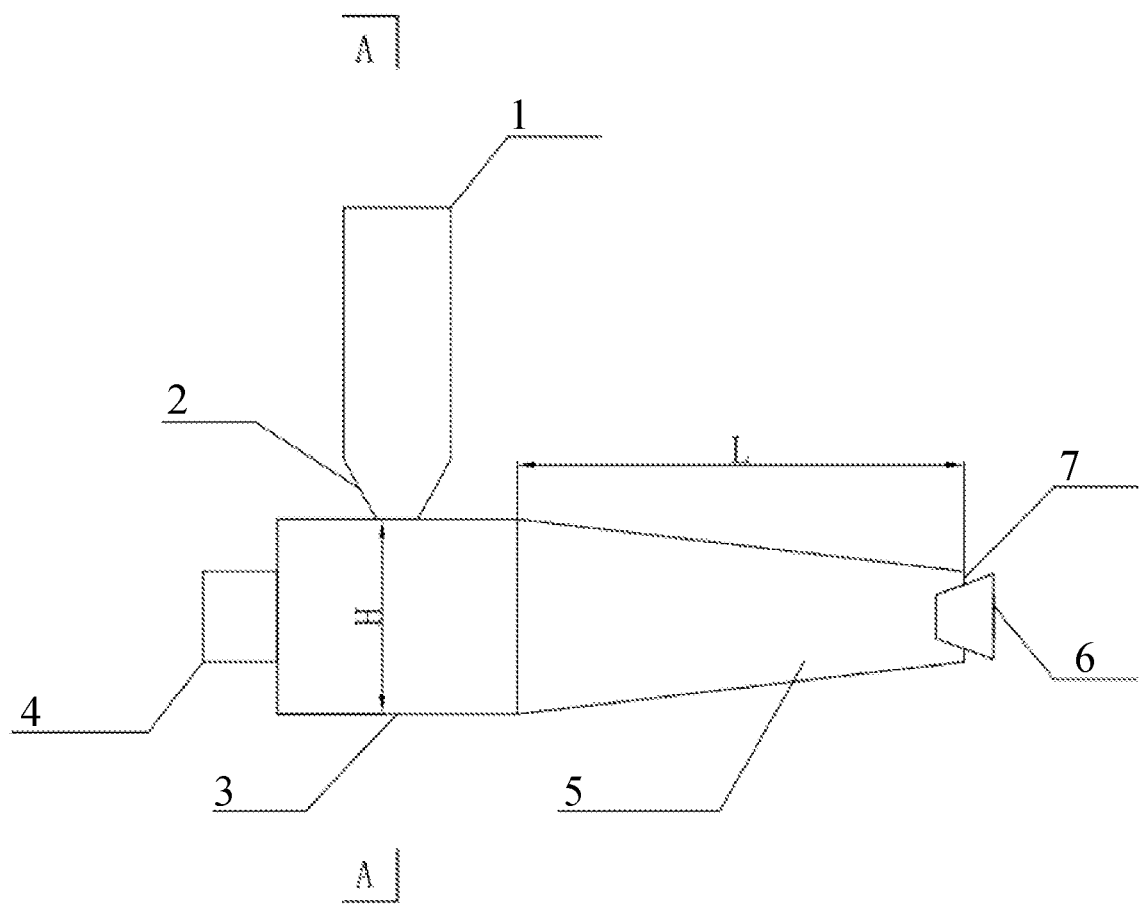
FIG. 1 shows a schematic structural diagram of a vortex quenching system.

The present disclosure provides a method for treating arsenic-containing flue gas, including the following steps:
- subjecting the arsenic-containing flue gas to a dry pre-dedusting treatment, to obtain dedusted flue gas;
- pre-cooling the dedusted flue gas and introducing the pre-cooled flue gas into a vortex quenching system to obtain high-temperature flue gas and low-temperature flue gas; and
- subjecting the low-temperature flue gas to a gas-solid separation to obtain treated flue gas and arsenic trioxide.

In some embodiments of the present disclosure, the arsenic-containing flue gas is subjected to a dry pre-dedusting treatment to obtain dedusted flue gas. In some embodiments of the present disclosure, the arsenic-containing flue gas is arsenic-containing smelting flue gas. In some embodiments of the present disclosure, the arsenic-containing flue gas has an arsenic element content of not more than 10 g/m$^3$, and preferably 1.53 g/m$^3$ to 2.384 g/m$^3$. In some embodiments, the arsenic-containing flue gas has a dust content of not more than 30 g/m$^3$, and preferably 12.25 g/m$^3$ to 18.53 g/m$^3$. In some embodiments of the present disclosure, the arsenic-containing flue gas has a temperature of 950° C. to 1100° C.

In some embodiments of the present disclosure, the dry pre-dedusting treatment is performed in a high temperature-resistant pre-dedusting system. In some embodiments of the present disclosure, the high temperature-resistant pre-dedusting system includes a ceramic filter or an electric dedusting equipment. In the present disclosure, there is no special requirement on a specific process of the dry pre-dedusting treatment, and process well known to those skilled in the art may be adopted. In some embodiments of the present disclosure, the dust removal rate of the dry pre-dedusting treatment is not less than 95%, and preferably not less than 99%.

In some embodiments of the present disclosure, the dedusted flue gas has a dust content of 0.12 g/m$^3$ to 0.143 g/m$^3$.

In the present disclosure, the dry pre-dedusting treatment is adopted to reduce the content of the smoke and dust in the flue gas, which is beneficial to stable operation of a subsequent heat energy utilization system and improved treatment effect of the vortex quenching system.

After the dedusted flue gas is obtained, the dedusted flue gas is pre-cooled and then introduced into an vortex quenching system, so as to obtain high-temperature flue gas and low-temperature flue gas. In some embodiments of the present disclosure, pre-cooling the dedusted flue gas includes introducing the dedusted flue gas into a heat energy utilization system and cooling. In the present disclosure, the dedusted flue gas is cooled by using the heat energy utilization system, which could realize the utilization of the heat energy of the flue gas. In some embodiments of the present disclosure, the heat energy utilization system includes a waste heat boiler, a heat pipe heat exchanger, or a heat pump.

In some embodiments of the present disclosure, by pre-cooling, the temperature of the dedusted flue gas is reduced to 300-350° C., and preferably 300-330° C. In the present disclosure, the operation efficiency of the vortex quenching system could be improved by pre-cooling the dedusted flue gas.

In some embodiments of the present disclosure, the pre-cooled flue gas is pressurized first and then fed into the vortex quenching system. In some embodiments of the present disclosure, the equipment for pressurizing the pre-cooled flue gas includes a gas inlet spray nozzle or a booster fan. In some embodiments of the present disclosure, the pressure of the pre-cooled flue gas is increased to 0.45-1 MPa by pressurizing. In the present disclosure, the velocity of the flue gas entering the vortex quenching system is increased by pressurizing, thereby improving the vortex cooling efficiency.

In some embodiments of the present disclosure, the flue gas has a residence time of 1 to 3 seconds in the vortex quenching system. In some embodiments, the low-temperature flue gas has a temperature of not higher than 150° C., and preferably 130-145° C.

Figure 2:
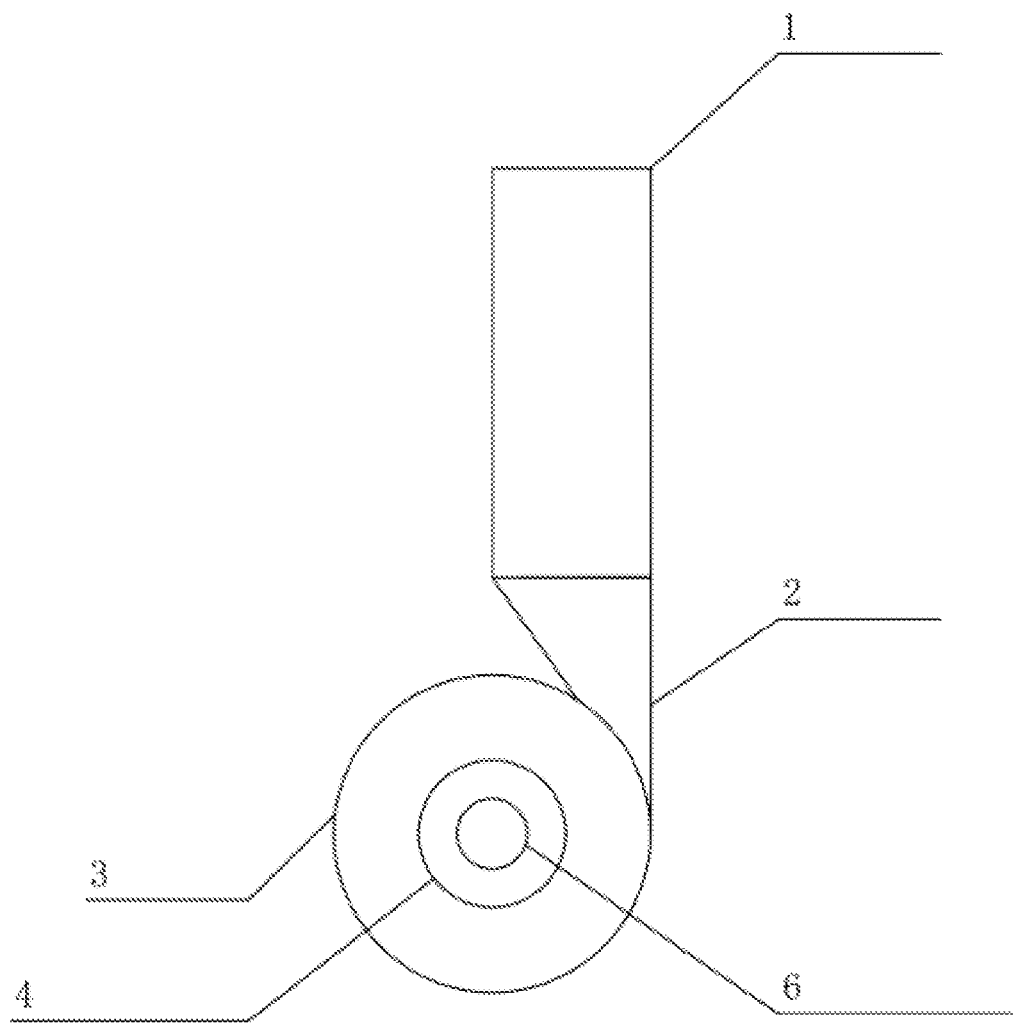
FIG. 2 shows an A-A sectional view of FIG. 1.

In the present disclosure, the vortex quenching system is shown in FIGS. 1 and 2. The vortex quenching system is described in detail in the present disclosure with reference to FIGS. 1 and 2.

In some embodiments of the present disclosure, the vortex quenching system is a vortex tube. In some embodiments of the present disclosure, the vortex tube is made of 304 stainless steel or 316 stainless steel.

In some embodiments of the present disclosure, the vortex quenching system includes a gas inlet pipe 1, a gas inlet spray nozzle 2, a vortex chamber 3, a low-temperature gas outlet 4, a high-temperature gas buffer chamber 5, a gas outlet adjustment valve 6, and a high-temperature gas outlet 7. The gas inlet spray nozzle 2 is arranged at the top of the vortex chamber 3. The gas inlet pipe 1 is connected to the gas inlet spray nozzle 2. The low-temperature gas outlet 4 is arranged on one side of the vortex chamber 3. The high-temperature gas buffer chamber 5 is arranged on the other side of the vortex chamber 3. The high-temperature gas outlet 7 is arranged at one end, far away from the vortex chamber 3, of the high-temperature gas buffer chamber 5. The high-temperature gas outlet 7 is provided with the gas outlet adjustment valve 6.

As one embodiment of the present disclosure, the gas inlet spray nozzle 2 is arranged in the tangential direction of the vortex chamber 3, and the gas inlet direction is tangent to the vortex chamber 3.

In the present disclosure, the relationship between the length L of the high-temperature gas buffer chamber 5 and the diameter H of the vortex chamber 3 is represented by L/H=20-40. In the present disclosure, different length-diameter ratios leads to different effects. In the present disclosure, the length-diameter ratio is defined as above, which could ensure that the temperature of the low-temperature flue gas is not higher than 150° C., thereby improving efficiency of producing the low-temperature flue gas.

In the present disclosure, the high-temperature flue gas is recycled to the heat energy utilization system. In some embodiments of the present disclosure, the high-temperature flue gas has a temperature of 585-650° C., and preferably 610-630° C.

In the present disclosure, the flue gas is pressurized and then fed into the vortex chamber in a tangent shape along the wall of the vortex chamber. Gas flow in the vortex chamber is subjected to a vortex exchange and then an energy conversion occurs. The gas flow is divided into a cold gas flow and a hot gas flow. At a terminal of the high-temperature gas buffer chamber, a part of compressed air is vented in a manner of hot air through the gas outlet adjustment valve, so as to obtain the high-temperature flue gas. The remaining compressed air returns at a lower speed through the center of rotating gas flow in the high temperature gas buffer chamber. The cold gas flow passes through the center of the vortex chamber to form ultra-low-temperature cold gas that is collected and discharged at the low-temperature gas outlet, so as to obtain the low-temperature flue gas.

In the present disclosure, a vortex quenching system is adopted to divide the flue gas into the high-temperature flue gas and the low-temperature flue gas. Arsenic could be recovered from the low-temperature flue gas. The high-temperature flue gas could be recycled to a heat energy utilization system for further utilization of heat energy, which improves the utilization rate of the heat energy of the flue gas. In the present disclosure, a vortex tube is used as a flue gas quenching facility, and has the advantages of simple structure, convenience in operation, strong resistance to gas fluctuation impact, safe and reliable operation, and easiness in maintenance.

After the low-temperature flue gas is obtained, the low-temperature flue gas is subjected to a gas-solid separation in the present disclosure, so as to obtain treated flue gas and arsenic trioxide. In some embodiments of the present disclosure, the gas-solid separation is performed in a bag-type dust collector. In the present disclosure, there is no special requirements for the structure and process parameters of the bag-type dust collector, and any bag-type dust collector well known in the art may be used.

In some embodiments of the present disclosure, the treated flue gas has an arsenic element content of 0.15-0.35 mg/m$^3$. In some embodiments, by the method according to the present disclosure, the arsenic removal rate is not less than 99%. In some embodiments of the present disclosure, the recovery rate of arsenic element in the arsenic-containing flue gas is in the range of 99 to 99.99%.

Technical solutions of the present disclosure are clearly and completely described below with reference to examples of the present disclosure. It is apparent that the described examples are only part of the examples of the present disclosure rather than all of the examples. On the basis of the examples of the present disclosure, all other examples obtained by those of ordinary skill in the art without creative work shall fall within the scope of the present disclosure.

In the present disclosure, the vortex quenching system used in the examples below is shown in FIGS. 1 and 2. The vortex quenching system is a vortex tube. The vortex tube includes a gas inlet pipe 1, a gas inlet spray nozzle 2, a vortex chamber 3, a low-temperature gas outlet 4, a high-temperature gas buffer chamber 5, a gas outlet adjustment valve 6, and a high-temperature gas outlet 7. The gas inlet spray nozzle 2 is arranged at the top of the vortex chamber 3. The gas inlet pipe 1 is connected to the gas inlet spray nozzle 2. The low-temperature gas outlet 4 is arranged on at the left end of the vortex chamber 3. The high-temperature gas buffer chamber 5 is arranged at the right end of the vortex chamber 3. The high-temperature gas outlet 7 is arranged at the right end of the high-temperature gas buffer chamber 5. The high-temperature gas outlet 7 is provided with the gas outlet adjustment valve 6. The gas inlet spray nozzle 2 is arranged in the tangential direction of the vortex chamber 3, and the gas inlet direction is tangent to the vortex chamber 3. The vortex tube is made of 304 stainless steel or 316 stainless steel.

Example 1

Figure 3:
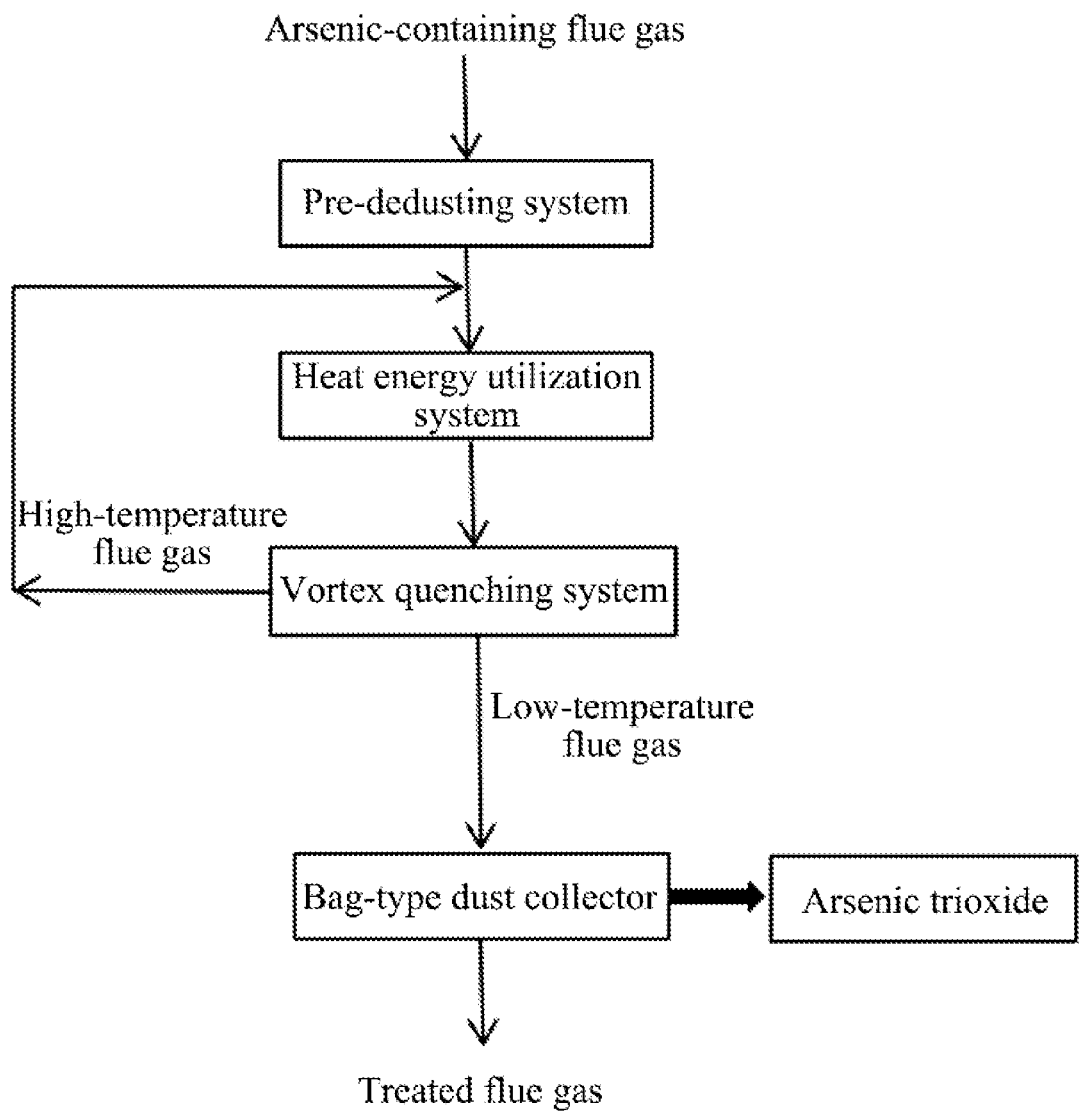
FIG. 3 shows a process flowchart of a method for treating arsenic-containing flue gas according to the present disclosure.

Smelting furnace flue gas of a certain copper smelting plant was treated according to the process flowchart shown in FIG. 3.

The smelting furnace flue gas of the certain copper smelting plant had a temperature of 1100° C. at the outlet, an arsenic element content of 2.384 g/m$^3$, and a dust content of 15.72 g/m$^3$. The flue gas was subjected to an electric dedusting treatment, thereby achieving a dust content of 0.143 g/m$^3$, and then fed into a waste heat boiler. The flue gas at the outlet of the waste heat boiler had a temperature of 330° C. The flue gas was then fed into a pressurization system and pressurized therein. The pressurized flue gas was then fed into a vortex tube made of 316 stainless steel (in which, the relationship between the length L of a high-temperature gas buffer chamber and the diameter H of a vortex chamber was represented by L/H=30). The residence time of the flue gas in the vortex tube was 2 seconds. The temperature of the low-temperature flue gas generated from the vortex tube was 145° C., and the temperature of the high-temperature flue gas was 610° C. The high-temperature flue gas was recycled to the waste heat boiler for the utilization of heat energy and then fed into the vortex tube. Gaseous arsenic trioxide in the low-temperature flue gas was converted into solid arsenic trioxide, and the solid arsenic trioxide was collected in a bag-type dust collector. The flue gas treated by the bag-type dust collector had an arsenic element content of 0.35 mg/m$^3$, and a dust content of 20 mg/m$^3$. The treated flue gas was discharged to a subsequent acid production work section. The solid arsenic trioxide was recovered, and the recovery rate of arsenic element was 99.98%.

Example 2

Roasting furnace flue gas of a certain zinc smelting plant was treated according to the process flowchart shown in FIG. 3.

The roasting furnace flue gas of the certain zinc smelting plant had a temperature of 950° C. at the outlet, an arsenic element content of 1.53 g/m$^3$, and a dust content of 12.25 g/m$^3$. The flue gas was subjected to an electric dedusting treatment, thereby achieving a dust content of 0.12 g/m$^3$, and then fed into a waste heat boiler. The flue gas at the outlet of the waste heat boiler had a temperature of 300° C. The flue gas was then fed into a pressurization system and pressurized therein. The pressurized flue gas was then fed into a vortex tube made of 304 stainless steel (in which, the relationship between the length L of a high-temperature gas buffer chamber and the diameter H of a vortex chamber was represented by L/H=40). The residence time of the flue gas in the vortex tube was 3 seconds. The temperature of the low-temperature flue gas generated from the vortex tube was 130° C., and the temperature of the high-temperature flue gas was 650° C. The high-temperature flue gas was recycled to the waste heat boiler for the utilization of heat energy and then fed into the vortex tube. Gaseous arsenic trioxide in the low-temperature flue gas was converted into solid arsenic trioxide, and the solid arsenic trioxide was collected in a bag-type dust collector. The flue gas treated by the bag-type dust collector had an arsenic element content of 0.15 mg/m$^3$, and a dust content of 18 mg/m$^3$. The treated flue gas was discharged to a subsequent acid production work section. The solid arsenic trioxide was recovered, and the recovery rate of arsenic element was 99.99%.

Example 3

Smelting furnace flue gas of a certain copper smelting plant was treated according to the process flowchart shown in FIG. 3.

The smelting furnace flue gas of the certain copper smelting plant had a temperature of 1000° C. at the outlet, an arsenic element content of 2.13 g/m$^3$, and a dust content of 18.53 g/m$^3$. The flue gas was subjected to an electric dedusting treatment, thereby achieving a dust content of 0.12 g/m$^3$, and then fed into a waste heat boiler. The flue gas at the outlet of the waste heat boiler had a temperature of 310° C., The flue gas was then fed into a pressurization system and pressurized therein. The pressurized flue gas was then fed into a vortex tube made of 316 stainless steel (in which, the relationship between the length L of a high-temperature gas buffer chamber and the diameter H of a vortex chamber was represented by L/H=20). The residence time of the flue gas in the vortex tube was 1 second. The temperature of the low-temperature flue gas generated from the vortex tube was 150° C., and the temperature of the high-temperature flue gas was 585° C. The high-temperature flue gas was recycled to the waste heat boiler for the utilization of heat energy and then fed into the vortex tube. Gaseous arsenic trioxide in the low-temperature flue gas was converted into solid arsenic trioxide, and the solid arsenic trioxide was collected in a bag-type dust collector. The flue gas treated by the bag-type dust collector had an arsenic element content of 0.28 mg/m$^3$, and a dust content of 16 mg/m$^3$. The treated flue gas was discharged to a subsequent acid production work section. The solid arsenic trioxide was recovered, and the recovery rate of arsenic element was 99.98%.

The method according to the present disclosure is simple, convenient to operate, strong in gas fluctuation impact resistance, safe and reliable in operation, and easy to maintain, and makes it possible to realize collaborative recovery of arsenic and heat energy in the flue gas.

The foregoing descriptions are merely preferred embodiments of the present disclosure. It should be noted that those of ordinary skill in the art may make a number of improvements or refinements without departing from the principle of the present disclosure. These improvements or refinements should also fall within the scope of the present disclosure.

What is claimed is:

1. A method for treating arsenic-containing flue gas, comprising:
   subjecting the arsenic-containing flue gas to a dry pre-dedusting treatment, to obtain dedusted flue gas;
   pre-cooling the dedusted flue gas and introducing the pre-cooled flue gas into a vortex quenching system to obtain high-temperature flue gas and low-temperature flue gas; and
   subjecting the low-temperature flue gas to a gas-solid separation to obtain treated flue gas and arsenic trioxide,
   wherein the pre-cooled flue gas has a residence time of 1 to 3 seconds in the vortex quenching system, and the low-temperature flue gas has a temperature of ≤150° C.

2. The method as claimed in claim 1, wherein the dry pre-dedusting treatment is performed in a high temperature-resistant pre-dedusting system.

3. The method as claimed in claim 1, wherein the gas-solid separation is performed in a bag-type dust collector.

4. The method as claimed in claim 1, wherein the treated flue gas has an arsenic element content of 0.15 to 0.35 mg/m$^3$, and a dust content of 16 to 20 mg/m$^3$.

5. The method as claimed in claim 1, wherein the vortex quenching system comprises a gas inlet pipe, a gas inlet spray nozzle, a vortex chamber, a low-temperature gas outlet, a high-temperature gas buffer chamber, a gas outlet adjustment valve, and a high-temperature gas outlet, wherein the gas inlet spray nozzle is arranged at the top of the vortex chamber; the gas inlet pipe is connected to the gas inlet spray nozzle; the low-temperature gas outlet is arranged on one side of the vortex chamber; the high-temperature gas buffer chamber is arranged on the other side of the vortex chamber; the high-temperature gas outlet is arranged in one end, far away from the vortex chamber, of the high-temperature gas buffer chamber; and the high-temperature gas outlet is provided with the gas outlet adjustment valve.

6. A method for treating arsenic-containing flue gas, comprising:
   subjecting the arsenic-containing flue gas to a dry pre-dedusting treatment, to obtain dedusted flue gas;
   pre-cooling the dedusted flue gas and introducing the pre-cooled flue gas into a vortex quenching system to obtain high-temperature flue gas and low-temperature flue gas; and
   subjecting the low-temperature flue gas to a gas-solid separation to obtain treated flue gas and arsenic trioxide,
   wherein pre-cooling the dedusted flue gas comprises introducing the dedusted flue gas into a heat energy utilization system and cooling.

7. The method as claimed in claim 6, wherein the high-temperature flue gas is recycled to the heat energy utilization system.

8. A method for treating arsenic-containing flue gas, comprising:
   subjecting the arsenic-containing flue gas to a dry pre-dedusting treatment, to obtain dedusted flue gas;
   pre-cooling the dedusted flue gas and introducing the pre-cooled flue gas into a vortex quenching system to obtain high-temperature flue gas and low-temperature flue gas; and
   subjecting the low-temperature flue gas to a gas-solid separation to obtain treated flue gas and arsenic trioxide,
   wherein the vortex quenching system comprises a gas inlet pipe, a gas inlet spray nozzle, a vortex chamber, a low-temperature gas outlet, a high-temperature gas buffer chamber, a gas outlet adjustment valve, and a high-temperature gas outlet, wherein the gas inlet spray nozzle is arranged at the top of the vortex chamber; the gas inlet pipe is connected to the gas inlet spray nozzle; the low-temperature gas outlet is arranged on one side of the vortex chamber; the high-temperature gas buffer chamber is arranged on the other side of the vortex chamber; the high-temperature gas outlet is arranged in one end, far away from the vortex chamber, of the high-temperature gas buffer chamber; and the high-temperature gas outlet is provided with the gas outlet adjustment valve.

9. The method as claimed in claim 8, wherein the gas inlet spray nozzle is arranged in the tangential direction of the vortex chamber.

10. The method as claimed in claim 8, wherein the relationship between the length L of the high-temperature gas buffer chamber and the diameter H of the vortex chamber is represented by L/H=20-40.

* * * * *